United States Patent [19]

Schulze et al.

[11] Patent Number: 4,818,395

[45] Date of Patent: Apr. 4, 1989

[54] DEVICE FOR ELIMINATING SCALE AND FOR PREVENTING THE FORMATION OF SCALE

[76] Inventors: Elfriede Schulze, Schildstrasse 22, 8673 Rehau; Eberhard Rudolph, Quadenberg 60, 8438 Berg/Opf., both of Fed. Rep. of Germany

[21] Appl. No.: 81,160

[22] Filed: Aug. 3, 1987

[30] Foreign Application Priority Data

Aug. 2, 1986 [DE] Fed. Rep. of Germany ... 8620798[U]
Aug. 28, 1986 [DE] Fed. Rep. of Germany ....... 3629288

[51] Int. Cl.$^4$ .............................................. C02F 1/48
[52] U.S. Cl. ..................................... 210/222; 210/695
[58] Field of Search ............... 210/222, 223, 695, 696; 209/223.1, 232; 55/100

[56] References Cited

U.S. PATENT DOCUMENTS

3,951,807 4/1976 Sanderson ........................... 210/222

FOREIGN PATENT DOCUMENTS

| 3428085 | 2/1985 | Fed. Rep. of Germany . | |
| 83/02241 | 7/1983 | PCT Int'l Appl. ................. | 210/222 |
| 227330 | 2/1969 | U.S.S.R. .............................. | 210/222 |
| 404509 | 4/1974 | U.S.S.R. .............................. | 210/222 |

*Primary Examiner*—W. Gary Jones
*Attorney, Agent, or Firm*—Lucas & Just

[57] ABSTRACT

The invention relates to a device for eliminating scale and for preventing the formation of scale in pipe systems through which a liquid, for example water, flows, in which arrangement the liquid is exposed to a magnetic field generated by a magnet coil, comprising an internal space which is formed in a housing and which is circularly symmetrical to a housing axis, with a partition which subdivides the internal space into two chambers and which is arranged perpendicularly to the housing axis, which partition is arranged with a distance on all sides from the inside surface, limiting the internal space, of the housing, with an inlet opening at one chamber, formed in the housing, and with an outlet opening at the other chamber, formed in the housing, in which arrangement the inlet opening and the outlet opening are in each case opposite to the central area of the partition, with a magnet coil, which concentrically encloses the partition and which is arranged in an annular recess of the housing, for generating the magnetic field, and with an annular wall section which concentrically encloses the partition and which is provided between the magnet coil around this inner wall and closes off the internal space of the housing at its circumference located radially on the outside, the partition and the housing consisting of ferromagnetic material at least in an area surrounding the internal space.

18 Claims, 4 Drawing Sheets

DEVICE FOR ELIMINATING SCALE AND FOR PREVENTING THE FORMATION OF SCALE

The invention relates to a device for eliminating scale and for preventing the formation of scale in pipe systems through which a liquid, for example water, flows, in which arrangement the liquid is exposed to a magnetic field generated by a magnet coil, comprising an internal space which is formed in a housing and which is circularly symmetrical to a housing axis, with a partition which subdivides the internal space into two chambers and which is arranged perpendicularly to the housing axis, which partition is arranged with a distance on all sides from the inside surface, limiting the internal space, of the housing, with an inlet opening at one chamber, formed in the housing, and with an outlet opening at the other chamber, formed in the housing, in which arrangement the inlet opening and the outlet opening are in each case opposite to the central area of the partition, with a magnet coil, which concentrically encloses the partition and which is arranged in an annular recess of the housing, for generating the magnetic field, and with an annular wall section which concentrically encloses the partition and which is provided between the magnet coil around this inner wall and closes off the internal space of the housing at its circumference located radially on the outside, the partition and the housing consisting of ferromagnetic material at least in an area surrounding the internal space.

The most varied devices or facilities for treating water for prevention of the formation of scale or calcium deposits in water-conducting pipe systems are already known. Among other things, devices are also known which provide the treatment of highly calcium- and iron-containing water by means of magnetic fields, these devices being based on the physical effect, verified by practical experiments, that the components contained in a calcium and iron-containing water and leading to deposits and thus also to disturbances or blocking in a water-conducting system "are neutralized" in their effect when the water passes through a magnetic field, in such a manner that deposits in the water-conducting system (on pipes, containers, electrical hot water generators, sanitary facilities and so forth) no longer occur or only occur to a very reduced extent which does not impair the functional capability of this system.

In particular, a device of the type initially mentioned is also known (German Offenlegungsschrift No. 3 428 085). Since practical tests have also shown that the effectiveness of the treatment of water in such devices or equipment, apart from the state variables of the water which continuously change in practical use (particularly the flow rate, pressure and temperature), with a predetermined field strength of the magnetic field, depends, above all, also on the time the water remains in the magnetic field, that is to say on the length of the water path through the magnetic field and on the fact that the direction of flow of the water intersects the magnetic lines at an angle of 90°, if possible, many known appliances and devices do not have an adequate effect under the continuously changing conditions in practical use, or an effect which is present with first use, is lost during the operating time, particularly also due to the deposits forming in the internal space of the device. The latter is the case particularly in the device of the type initially mentioned in which iron-containing deposits in the internal space of the device through which the water flows lead to a continuous reduction in the magnetic field strength of the magnetic field which is generated by the magnet coil and through which the water flows.

The invention is based on the object of developing a device of the type initially described to such an extent that correct and optimum operation is ensured without maintenance work even after a relatively long operating time.

To achieve this object, a device of the type initially described is constructed in such a manner that the partition and the housing are produced of soft-magnetic material at least in the area surrounding the internal space, that the annular wall section consists of a non-magnetic material and has in the direction of the housing axis a width which is preferably at least greater than the smallest distance between the inside surface of the housing and an opposite surface of the partition.

In the device according to the invention, the parts of the housing and of the partition to which the magnetic flux is applied are produced of a soft-magnetic material, for example of transformer ferrite, permalloy or of mu metals. The housing and the partition of the device according to the invention preferably consist of a ferritic material, that is to say that housing or the parts forming this housing and the partition of the device are in each case made of cast iron which is annealed after the casting and then machined.

The material used for the production of the housing of the device according to the invention has the advantage of low coercivity and especially also the property that, when the magnet coil is driven with a pulsating direct current, only a lesser magnetic remanence is present in the time intervals in which no current flows through the magnet coil or, when the magnet coil is driven with an alternating current, an alternating magnetic field is produced which very accurately follows the current through the magnet coil. Particles which may become deposited for a short time in the internal space of the housing are thus released, on account of the lack of magnetic remanence, from the inside surface of the housing during the time intervals in which the magnetic field is not present (with a pulsating magnetic field) and are entrained by the water or (with an alternating magnetic field) repelled again from the inside surface of the housing.

It is also particularly essential for the operation of the device according to the invention that the annular wall section of non-magnetic material, which limits at its peripheral area the internal space of the housing through which the water flows, has in the direction of the housing axis a length which is greater than the smallest distance between the inside surface of the housing which limits the internal space and the partition. This ensures that the magnetic lines of the magnetic field generated by the magnet coil mainly extend between the opposite inside surfaces of the housing, including the partition, where these magnetic lines are to the greatest extent intersected perpendicularly by the flow direction of the water and that, in particular, the magnet gap formed at the annular wall section also is not bridged by iron-containing deposits in the internal space of the housing (even during a relatively long operating period) which would lead to a reduction of the magnetic field strength in the area of the internal space through which water flows and thus to a decrease and, finally, to a complete cancellation of the functional capability.

In a preferred embodiment of the invention, the inside surface of the housing and the two sides of the partition are in each case provided with circularly annular steps enclosing the housing axis in the form that these steps additionally result in a zig-zag-shaped change in the direction of the water flow through the internal space of the housing as a result of which an adequate stay time is achieved even with a high rate of water flow, that is to say with high flow rates. In addition, this zig-zag-shaped change in the flow causes the flowing water to intersect the magnetic lines several times as accurately as possible at 90°, that is to say in a manner which is optimal for the operation.

The minimum gap width, existing in one embodiment of the invention, of the gap (magnet gap) formed between the magnet coil and the internal space, of at least 3.8 mm ensures that iron-containing particles or calcium- and iron-containing particles contained in the treated water even after a relatively long operating time cannot become deposited at the surfaces of the internal space of the housing of the device to such an extent that the magnetic gap is bridged by these deposits and thus the magnetic flux is largely "short-circuited" via these deposits.

The surfaces of the housing limiting the internal space and the surfaces of the partition are preferably provided with a coating of a corrosion-resistant material (metal) with a high magnetic conductivity value. As a result, these surfaces have a smooth surface structure but no iron-containing particles can be permanently deposited on the said surfaces even due to magnetic action, that is to say due to the smooth surface structure, such particles are carried along or entrained by the water flowing through the internal space of the housing. In addition, the magnetic flux through the area of the internal space of the housing through which the water flows can be improved by this layer.

The above-mentioned layers of corrosion-resistant material are particularly advantageous for creating a smooth surface structure, especially if the previously mentioned soft-magnetic material is used, particularly with the use of an iron casting for the housing and for the partition which is reannealed after casting, because the use of these magnetic materials for the production of the housing and of the partition, respectively, leads to a relatively rough surface structure even after the machining which is severely attacked by the water or by the substances contained in the water which would additionally contribute to an increase in the roughness of the surface structure and thus to the risk of a deposition of foreign substances.

The layers of corrosion-resistant material preferably consist of nickel or cobalt and can be applied, for example, by galvanic or other suitable means.

In a preferred embodiment of the device according to the invention, the partition is constructed in a slight oval or other type of shape at its edge so that, if the radially outwardly located area of the internal space of the housing which is arranged to be opposite this edge area is of a circularly annular construction, a gap results between the said areas which changes in its width along the edge area of the partition as a result of which the state variables of the water (particularly flow rate and pressure), which continuously change in practice, are taken into account for an optimum treatment of the water.

Further developments of the invention are the subject-matter of the subclaims.

In the text which follows, the invention is explained in greater detail on illustrative embodiments, with the aid of the figures in which.

Figure 1:
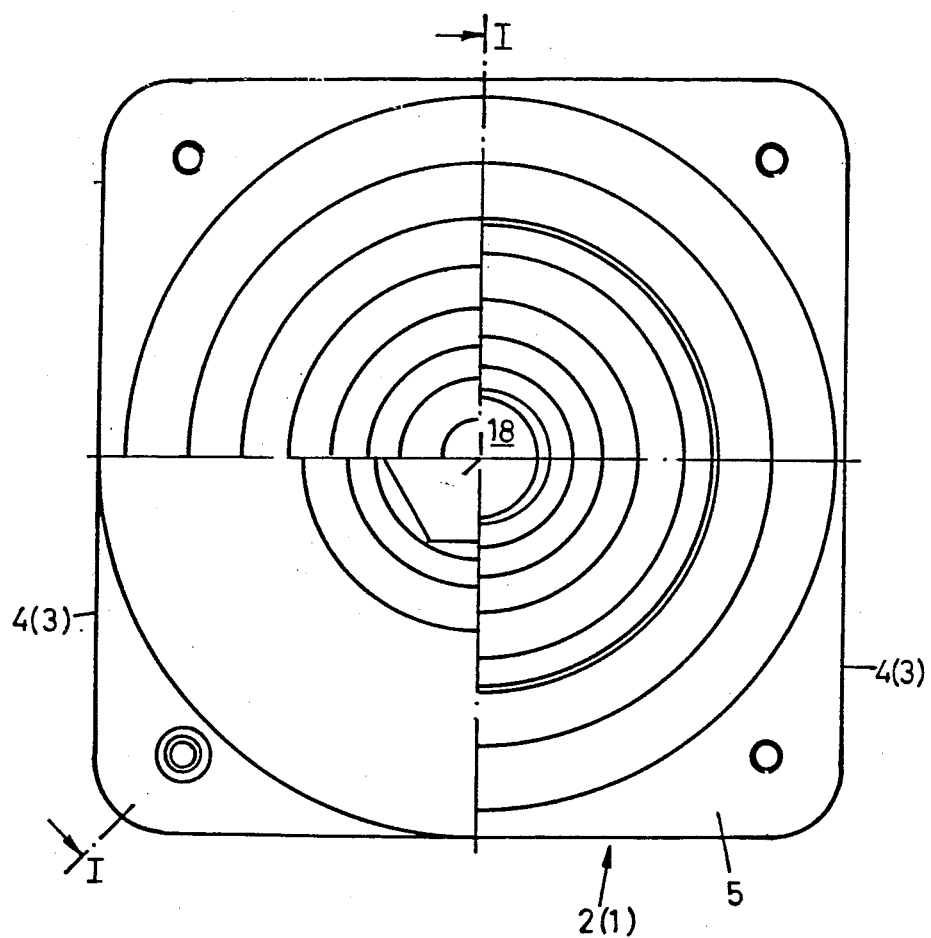
FIG. 1 shows a first embodiment of the device according to the invention in a top view, that is to say in the direction of looking at the housing axis, in partial section and there partially also with the omission of the partition.
Figure 2:
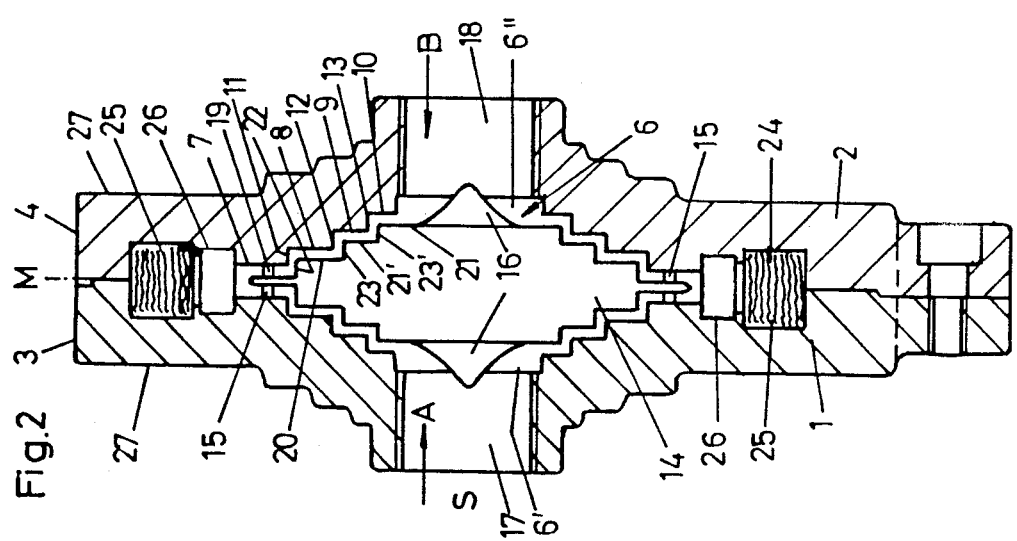
FIG. 2 shows a section according to line I—I of FIG. 1.

The device shown in FIGS. 1 to 2 consists of two dish-shaped housing parts 1 and 2 which exhibit in each case a square circumferential area 3 and 4 of the same size with rounded edges and are otherwise constructed to be rotationally symmetric to an axis of symmetry S which, with housing parts 1 and 2 mounted against each other, forms the housing axis and also intersects the points of intersection of the diagonals connecting the corners of the circumferential areas 3 and 4. The housing parts 1 and 2 are produced of ferritic material, that is to say of cast iron (for example GG25), this casting being annealed after the casting and being subsequently machined. This ferritic material has optimum magnetic characteristics with supportable production costs and with the possibility of machining after the casting and annealing and sufficient mechanical strength. The housing parts 1 and 2 are shaped or provided with a recess which is open towards the respective front face 5 at their front faces 5 resting against each other in the mounted housing, in such a manner that an internal space 6 is produced in the interior of the housing which is circularly or rotationally symmetrically constructed with respect to the axis of symmetry S and which is closed off towards the outside by housing parts 1 and 2 or by their internal surface limiting internal space 6. The inside surfaces of housing parts 1 and 2, limiting the internal space 6, have several annular steps. These are formed by annular areas 7, 8, 9 and 10 and 11, 12 and 13 which in each case enclose the axis of symmetry S and are located on the same axis as this axis of symmetry S, the annular areas 7 to 10 being located perpendicular to the axis of symmetry S with their surface and the annular areas 11 to 13 being located parallel to the axis of symmetry or perpendicular to the radius of the rotationally symmetrical internal space with their surface. The circularly cylindrical annular area 11 of the annular areas 11 to 13 has the largest radius, the circularly cylindrical annular area 13 the smallest radius and the circularly cylindrical annular area 12 a radius which approximately corresponds to the mean value between the radius of the annular area 11 and the radius of the annular area 13. In addition, the annular area 11 between annular areas 7 and 8, the annular area 12 between annular areas 8 and 9 and the annular area 13 between annular areas 9 and 10 are provided in such a form that the distance of the two housing parts 1 and 2 from one another in the area of their inside surfaces limiting the internal space 6 in the direction parallel to the axis of symmetry S decreases with increasing distance from the axis of symmetry S in accordance with the arrangement of the annular areas 7 to 10.

In the internal space 6, a partition 14 is arranged which also consists of ferritic material and subdivides the internal space 6 into two chambers 6' and 6". The partition 14, which is constructed like a circular disk, that is to say rotationally symmetrical with respect to its center axis, is held, this center axis being on the same axis as the axis of symemtry S or housing axis, in the internal space 6 at a distance on all sides from the inside surface of housing parts 1 or 2, which limit the internal space 6, by spacers 15 consisting of non-magnetic material, for example also plastic, and also has a diameter which is smaller than the maximum diameter of the internal space 6 so that a flow medium connection exists between chambers 6' and 6" in the radially outside area of the internal space 6, which is limited by the annular areas 7 of the two housing parts 1 and 2, around the circularly annular edge of the partition 14. The partition 14 is provided at its center on both sides with a projection 16 which is in each case constructed as a point, the projection 16 provided in chamber 6' being directly opposite on one side of the partition 14 to an inlet opening 17 exhibiting an internal thread and the projection 16 provided in chamber 6" being directly on the other side of partition 14 to an outlet opening 18 also provided with an internal thread. The axes of the inlet opening 17 and the outlet opening 18 are also provided on the same axis as the axis of symmetry S and as the housing axis on housing part 1 and 2, respectively.

In addition, the partition 14 is constructed on both sides with annular steps extending concentrically with respect to the axis of symmetry S, in such a manner that the thickness of the partition 14 decreases in a step-shaped manner in the direction of the axis of symmetry S towards the circumference of the partition 14. As a result, annular areas 19, 20, 21, 21', which enclose the axis of symmetry S on each side of the partition 14 and which are perpendicular with respect to the axis of symmetry S with their surfaces and intermediate annular areas 22, 23, 23', which also concentrically enclose the axis of symmetry S but are parallel to the axis of symmetry S with their surface are formed, the outer annular area 19 of which passes into the circumferential edge of the partition 14 and the inner annular area 21 of which encloses the respective projection 16. Of the annular areas 22 and 23', the annular area 22 has the larger radius and is provided between annular areas 19 and 20. Annular area 23' is provided between annular areas 21 and 21'. As is shown in FIG. 2, each annular area 19 is essentially opposite to an annular area 7, each annular area 20 is essentially opposite to an annular area 8 and the annular area 21 and 21' is essentially in each case opposite to an annular area 9 and 10 in the direction of the axis of symmetry S. In addition, the arrangement is made in such a manner that the radius of the annular areas 22 is smaller than the radius of the annular areas 11 and the radius of the annular areas 23 and 23' is smaller than the radius of the annular areas 12 and 13, respectively.

In the area of housing parts 1 and 2 enclosing the internal space 6, a groove-shaped indentation 24 extending concentrically with respect to the axis of symmetry is in each case provided in the housing parts on their front faces 5, these indentations supplementing each other, when the housing parts 1 and 2 are connected to one another, to form an annular duct in the interior of the housing which concentrically encloses the partition 14 and in which an annular magnet coil 25 also concentrically enclosing the partition 14 is arranged. Between the magnet coil 25 or the annular duct accommodating this magnet coil, respectively, and the internal space 6 an annular seal 26, also concentrically enclosing the partition 14, of a non-magnetic material, preferably of rubber or plastic, is clamped between the two housing parts 1 and 2, which seal forms with its inner ring surface facing the axis of symmtry S the outer circularly annular limiting or circumferential area of the internal space 6. It is essential that, with the housing assembled, the two housing parts 1 and 2 or their front faces 5 have in the area of the seal 26 but also in the area located, with reference to the axis of symmetry S, radially outside the seal 26 between the latter and the duct accommodating the magnet coil 25, a distance from one another which is in any case greater than the distance between the annular areas 7 and 19 facing each other in each case, preferably also greater or at the most equal to the distance between the annular areas 10 and 21 facing one another. This ensures that, when a current (for example modulated or pulsed direct current), preferably a direct current the polarity of which can be changed in accordance with a timing program, is applied to the magnet coil 25 a magnetic flux with the required strength can form in the internal space 6 and in the two chambers 6' and 6", especially also in the radially outside part of these chambers limited by annular areas 7 to 13 and 19 to 23', including partition 14, which magnetic flux generated by the magnet coil 25 thus extends only directly between housing parts 1 and 2 and only insignificantly bypasses the internal space 6. The large distance of housing parts 1 and 2 in the area of seal 26 and the relatively large dimension of this seal in the direction of the axis of symmetry S also prevents the magnetic field generated by coil 25 from being short-circuited by iron or iron-oxide containing deposits between housing parts 1 and 2 in the area of the annular inside surface of seal 26 and thus the effect of the device being lost due to the lack of a magnetic field with adequate field strength in the internal space 6 and in the chambers 6' and 6".

For reasons of mechanical strength but also for achieving as uniform as possible a magnetic resistance, the two housing parts 1 and 2 are also constructed in the manner of annular steps concentrically with respect to the axis of symmetry S on their outside surfaces 27 facing one another when the housing is assembled, in such a manner that the distance of annular areas 7 to 10 from the part of outside surface 27 which is opposite in the direction of the axis of symmetry S is in each case the same, that is to say housing parts 1 and 2 have in each case an approximately uniform thickness, starting from the axis of symmetry S.

In practical use, the device is connected to a water-connecting pipe or inserted into the run of this pipe with its inlet opening 17 and with its outlet opening 18 in such a manner that the water can flow in accordance with arrow A through inlet opening 17 into chamber 6' and flow out in accordance with arrow B from chamber 6" through outlet opening 18. After flowing in through inlet opening 17, the water flow is first deflected radially outwards, this deflection being promoted by projection 16, that is to say projection 16 is mainly also used for preventing as far as possible a formation of eddies in the inflowing water during the deflection. After flowing around the outer and annular edge of partition 14, the water reaches chamber 6" and in this chamber first flows radially inwards and then, after changing the direction of flow, off through outlet opening 18. A formation of eddies of the water flowing off from chamber 6" during the change in the direction of flow is largely also prevented by the projection 16 provided in chamber 6". In addition, projections 16 prevent deposits especially on partition 14 which could lead to a blockage or functional disturbances of the device.

During the flow radially outwards in chamber 6' and radially inwards in chamber 6", that is to say along the flow path limited between annular areas 7 to 13 and 19 to 23, the water intersects the magnetic lines of the magnetic field generated by magnet coil 25 as a result of which the calcium- and iron-containing foreign substances contained in the water are "neutralized" by the pulsating magnetic field in such a manner that no calcium deposits or formation of scale can occur in the water-conducting pipe line system following the device.

Due to the construction of the device described, firstly an effective formation of the magnetic field is achieved in the areas of chambers 6' and 6" through which the water flows, as has already been described above, and disturbances of this magnetic field due to deposits in the area of seal 26 are prevented. Due to the annular steplike construction both of the inside surface of housing parts 1 and 2 limiting the internal space 6 and of both sides of the partition 14, it is also achieved that an increased concentration of the magnetic lines is achieved in each case in the area of the edges of this annular step shaped construction, that is to say at the area of transition between the annular areas 7 to 10 and the annular areas 11 to 13 and at the area of transition between annular areas 19 to 21' and the annular areas 22 to 23'.

Since the effect achieved with the device, with a predetermined field strength of the magnetic field generated by means of magnet coil 25, depends, in addition to the chemical and physical state variables of the water (flow rate, temperature and pressure) which frequently changes and cannot be influenced in a practical operation, primarily also on the respective stay time of the water in the magnetic field and on the fact that the magnetic lines generated by magnet coil 25 should extend as perpendicular as possible to the flow direction of the water, particularly advantageous results are obtained with the device described by the fact that, at least in the outer area of chambers 6' and 6", the water during its flow radially outwards and radially inwards at the same time is also subjected to a zig-zag-shaped deflection from an essentially radial flow direction into an axial flow direction and subsequently back into a radial flow direction. For this purpose, the annular areas 7 and 19 and 8 and 20 facing each other in each case and the intermediate annular area 11 and 22 are arranged in such a manner that between the annular areas 7 and 19 and between the annular areas 8 and 20 annular spaces are formed in chambers 6' and 6" which are not only concentric to the axis of symmetry and which (spaces) are connected to one another via a lower and an upper annular opening formed between annular areas 11 and 22 but, to achieve this additional zig-zag-shaped deflection, the annular area 7 and the annular area 20 are provided in each chamber 6' and 6" in such a manner that these areas have at least the same distance from a central plane M extending perpendicularly to the axis of symmetry S. Advantageously, however, the annular area 20 limiting the inner annular area of each chamber 6' and 6" at the partition 14 has a greater distance from the central plane M than the annular area 7 limiting the outer annular space at the inside surface of housing part 1 and 2, respectively. Such annular spaces are also formed between areas 9 and 21' and 10 and 21. The annular steps at the inside surface of housing parts 1 and 2 and at the partition 14 can be constructed, for example, in such a manner that the distance between the inside surface of housing parts 1 and 2 and partition 14 decreases with increasing radial distance from axis S. This construction provides the possibility of various pressure and flow conditions in internal space 6 so that, independently of the state variables of the water (temperature, flow rate and pressure), which changes in practical use and cannot be influenced, optimum conditions always exist for the treatment in at least some areas of the internal space 6.

Figure 3:
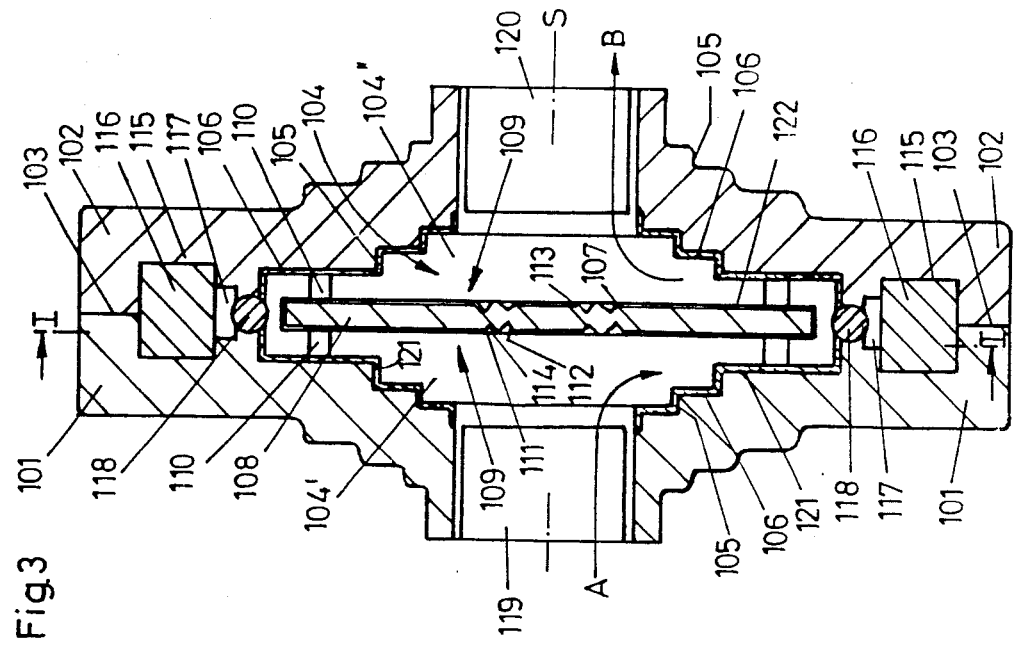
FIG. 3 shows a diagrammatic representation and longitudinal section of another embodiment of the device according to the invention.
Figure 4:
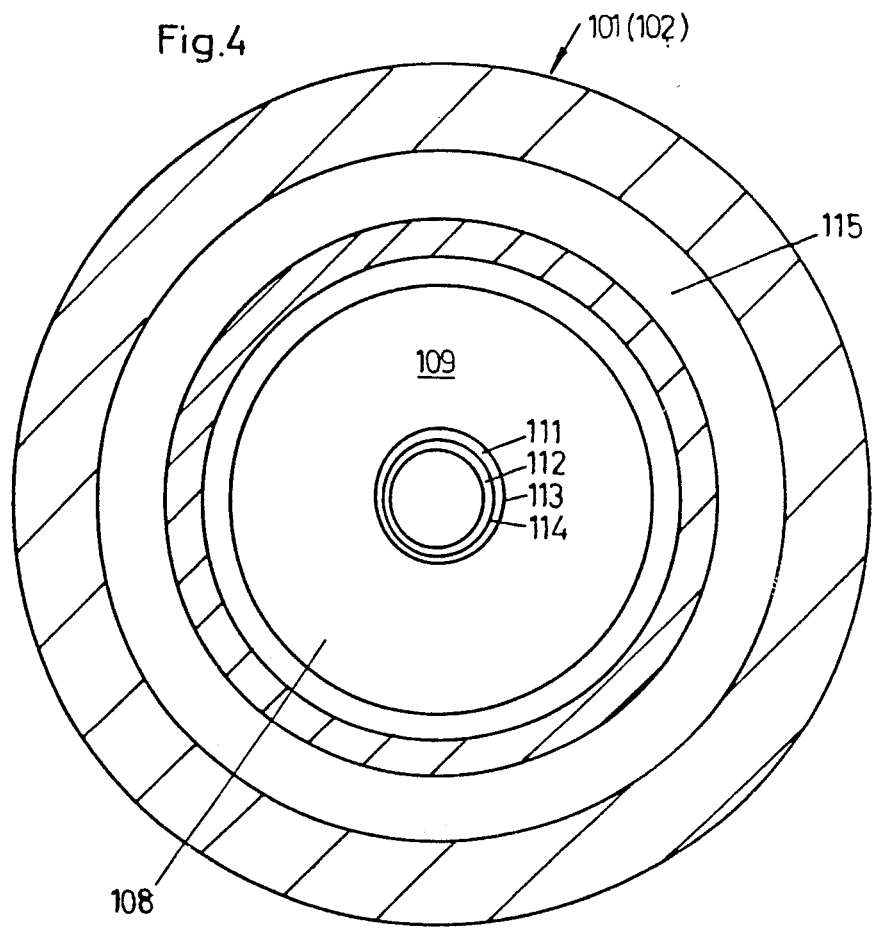
FIG. 4 shows a simplified representation of a section according to line I—I of FIG. 3.
Figure 5:
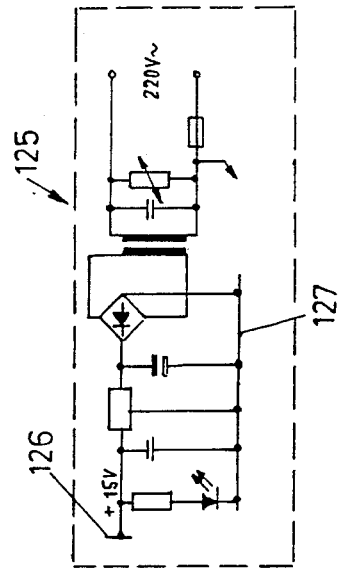
FIG. 5 shows an electric circuit for driving the magnet coil of the device according to FIG. 3.
Figure 5:
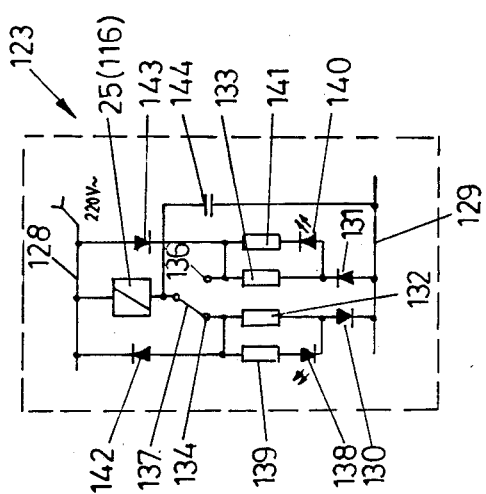
Figure 5:
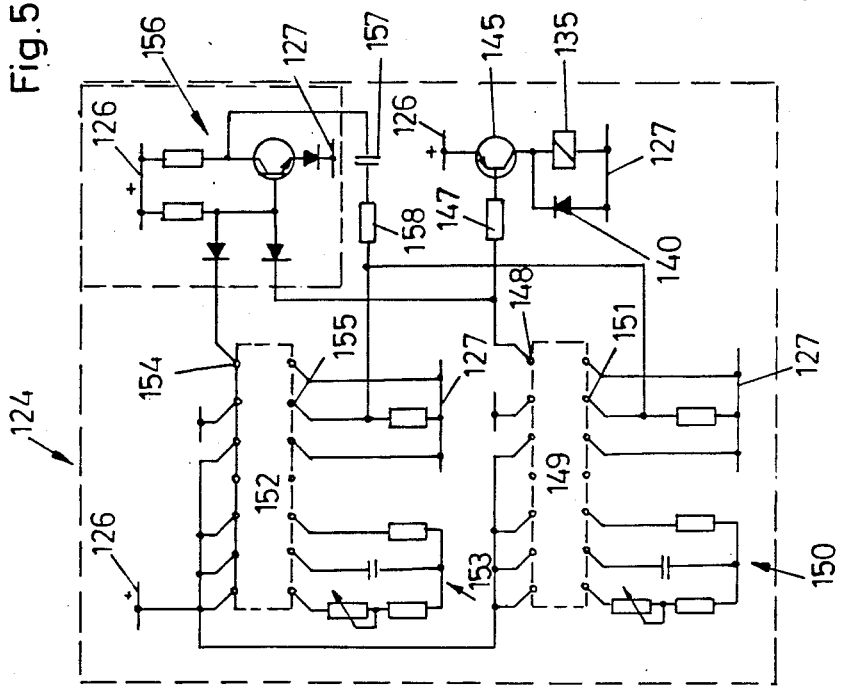

The device shown in FIGS. 3 to 5 consists of the two dish-like housing parts 101 and 102 which, also in this embodiment are again rotationally symmetrically constructed with respect to an axis of symmetry S which forms the housing axis when the housing parts 101 and 102 are mounted against each other. The housing parts 101 and 102 are produced of cast iron with a C content of less than 0.5%, preferably of ferritic material, that is to say of cast iron (for example GG 25), this casting being annealed after the casting and subsequently machined. The last-mentioned ferritic material has optimum magnetic characteristics with supportable production costs and with the possibility of machining after casting and annealing and sufficient mechanical strength. The housing parts 101 and 102 are shaped or machined, or provided with a recess which is open towards the respective front face 103, on their front faces 103 resting against one another when the housing is assembled, in such a manner that an internal space 104 which is circularly or rotationally symmetrically constructed with respect to the axis of symmetry S is obtained in the interior of the housing which is closed off towards the outside by the housing parts 101 and 102 and by their inside surfaces limiting the internal space 104. The inside surfaces of housing parts 101 and 102 limiting the internal space 104 have several annular steps. These are formed by annular areas 105 and 106 which in each case enclose the axis of symmetry, are located on the same axis as the axis of symmetry S and are arranged concentrically with respect to one another and of which the annular areas 105 are located parallel to the axis of symmetry or perpendicular to the radius of the rotationally symmetrical internal space 104 with their surface and the annular areas 106 are perpendicular to the axis of symmetry S with their surface. At the area of transition between annular areas 105 and 106 which are in each case adjacent to one another and form one step, in each case an edge 107 is formed which circularly annularly encloses the axis of symmetry S. In addition, the arrangement is made in such a manner that the distance between the annular areas 105 and 106 opposite to one another in the direction of axis of symmetry S at housing parts 101 and 102 decreases with increasing distance from the axis of symmetry S.

In the internal space 104, a partition 108 is arranged which also consists of ferromagnetic material, preferably of ferritic material and subdivides internal space 104 into two chambers 104' and 104". The partition 108 is constructed like a disk, is arranged on the same axis as the axis of symmetry S with its center axis extending perpendicularly to the front faces 109 of partition 108 and held at a distance on all sides from the inside surface of housing parts 101 and 102 limiting the internal space 104 by spacers 110. As is shown in FIG. 4, partition 110 has a slightly oval cross-section, as a result of which the maximum diameter of the partition 108 is smaller than the maximum cross-section of the internal space 104 so that a flow connection exists between chambers 104' and 104" around the edge of partition 108 in the area of internal space 104 located radially outwardly and limited by the two outermost annular areas 106 of housing parts 101 and 102. Due to the slightly oval shape of the outside circumference or of the edge of partition 108, the gap along the edge of partition 108, formed between this edge of partition 108 and the inside surface of the housing and producing the flow medium connection between the chambers 104' and 104" has a varying width with a circularly symmetrical construction of the internal space 104, that is to say this gap has its smallest width at two sections which are offset with respect to one another by 180° around the axis of symmetry S and this gap has its greatest width at two sections which are in each case offset by 90° with respect to the first sections around the axis of symmetry S. First of all, this varying gap width takes account of the state variables of the water flowing through internal space 104 (particularly flow rate, pressure and temperature) which vary in practice, in such a manner that the treatment of the water is optimum for all state variables occurring in practice. In addition, an optimum path of the magnetic lines of field is achieved by this gap varying in its width around the circumference of the partition which is also optimum for an optimum treatment of the water.

Two cross-sectionally V-shaped indentations 111 and 112 which are arranged concentrically with respect to one another and directly adjoin each other in the embodiment represented and are located on the same axis as the axis of symmetry S are turned into the two front faces 109 of partition 108, the edge of these indentations and particularly also the transition between these indentations forming edges 113 and 114 at which the magnetic lines of field emerge preferentially, that is to say concentrated into the space of chamber 104' and 104" just as at the edges 107, as a result of which the treatment of the water flowing through the device is also improved.

In the area of housing parts 101 and 102 enclosing internal space 104 in each case a groove-shaped indentation 115 extending concentrically with respect to the axis of symmetry S is in each case inserted into their front faces 103, the two indentations 115 supplementing each other, when housing parts 101 and 102 are connected to one another, to form an annular duct concentrically enclosing the internal space 104 and the partition 108 in the interior of the housing in which duct an annular magnet coil 116 is arranged which also essentially concentrically encloses partition 108. Housing parts 101 and 102 rest flatly against one another with their front faces 103 radially outside the magnet coil 116. Radially inside of magnet coil 116 and of duct 115, the housing parts 101 and 102 are constructed on their front face 103 in such a manner that at this location, when housing parts 101 and 102 are mounted against each other, a gap remains between these housing parts which, starting from magnet coil 116, extends radially inwards into internal space 104. In this gap 117, an annular seal or sealing ring 118 is arranged which is clamped between housing parts 101 and 102, concentrically encloses axis of symmetry S and closes off the internal space 104 of the housing towards magnet coil 116 and towards duct 115, respectively. In the embodiment according to FIG. 3 defined, the width of gap 117 is at least 3.8 mm in an axial direction parallel to the axis of symmetry S, which ensures that the greatest proportion of the field or magnetic lines of the magnetic field generated by coil 116, for effective treatment of the water flowing through the housing and the internal space 104, extends between housing parts 101 and 102 (including partition 108) in the area of internal space 104 and in the area of chambers 104' and 104", and particularly also in such a manner that the water flowing through chambers 104' and 104" intersects these magnetic lines of field if possible at an angle of 90° as is the aim for optimum treatment. Due to the fact that gap 117 has a width of at least 3.8 mm, it is also ensured that this gap cannot be closed by iron- or iron-oxide containing particles contained in the treated water and deposited and cannot be bridged by such particles in the area of sealing ring 118 and within internal space 104, that is to say radially inside sealing ring 118, which would lead to a reduction of the magnetic lines intersecting internal space 104 and chambers 104' and 104".

In the central area, the housing part 101 is provided with an inlet opening 119 which concentrically encloses the axis of symmetry S and the opening of which, which opens into chamber 104', is approximately opposite to the annular indentations 111 and 112 of the relevant front face of the partition 108. In the central area, the housing part 102 is provided with an outlet opening 120 which corresponds to inlet opening 119 with respect to arrangement and construction. In practical use, the device is connected with its inlet opening 119 and with its outlet opening 120 to a water-conducting pipe or inserted into the run of this pipe in such a manner that the water can flow into chamber 104' through inlet opening 119 in accordance with arrow A and flow out of chamber 104" through outlet opening 120 in accordance with arrow B. After flowing in through inlet opening 119, the water stream is first radially deflected towards the outside. After flowing around the outer, slightly ovally constructed edge of partition 108, the water passes into chamber 104" and in this chamber first flows radially inward and then, after changing its direction of flow, off through outlet opening 120.

During the flow in chamber 104' radially towards the outside and in chamber 104" radially towards the inside, that is to say along the flow path limited between annular areas 105 and 106 and front faces 109 of partition 108 the water intersects the magnetic lines of the magnetic field generated by magnet coil 116 as a result of which the calcium- and iron-containing foreign substances contained in the water are "neutralized" by the pulsating magnetic field in such a manner that no calcium deposits can occur or scale can form in the water-conducting pipeline system following the device.

As a result of the annular indentations 111 and 112 and of the edges 113 and 114 formed by these indentations and of the distribution or concentration of the magnetic field lines caused by these edges, the water entering through the input opening 119 and flowing off through the outlet opening 120 is already subjected to a treatment during this first entry and also during the emergence into the internal space and out of the internal space, respectively.

To prevent calcium- and iron-containing foreign substances, which bridge the annular step additions necessary for the emergence of the magnetic lines and for an optimal flow within the internal space 104 and formed by annular areas 105 and 106, the magnetic gap (gap 117) formed between housing parts 101 and 102 in the area of the sealing ring 118 and/or could block the flow channel formed within the internal space 104 of the housing, become deposited on the surfaces of housing parts 101 and 102 limiting the internal space 104 and on the surfaces of partition 108 due to magnetic effect due to the unavoidable magnetic remanence of the ferrromagnetic material of housing parts 101 and 102 and of the partition 108, housing parts 101 and 102 are provided on their surfaces limiting the internal space 104 and partition 108 is provided at its front faces 109 and on the radially outside edge and on the radially outside rim with a layer 121 and 122 of a corrosion-resistant metal having a high magnetic conductivity, for example with a layer 121 and 122 of cobalt or nickel. Not only does this layer improve the magnetic flux in the area of chambers 104' and 104" but this layer 121 and 122 also creates a smooth surface structure for the surfaces of housing parts 101 and 102 limiting the internal space 104 and for the surfaces of partition 108 so that calcium- and iron-containing foreign substances cannot become deposited there due to magnetic influence but instead are carried along or are entrained by the water flowing through internal space 104 in spite of existing magnetic forces.

As mentioned above, the magnetic coil 25 and 116 is driven with a direct current the polarity of which is changed in accordance with a particular timing program which is made possible by the circuit shown in FIG. 5.

The circuit shown in FIG. 5 and intended for connection to the customary supply and alternating-current system (50/60 Hz/220 V) consists of three groups, namely of the load circuit 123 exhibiting the magnet coil 25 and 116 and operated with the supply system voltage, of control circuit 124 and of a power supply section 125 which is constructed in the usual manner and supplies between its output terminal 126 and circuit ground 127 a constant direct voltage for supplying the control circuit 124.

The load circuit 123, which is connected, for example, to phase 128 and the neutral conductor 129 of the supply voltage system contains two diodes 130 and 131 of opposite polarity which are in each case connected in series with a protective resistor 132 and 133 and of which the cathode of diode 130 and the anode of diode 131 are in each case connected to neutral conductor 129. Diode 130 is connected via resistor 132 to the normally-closed contact 134 of a relay 135 whilst diode 131 is connected via resistor 133 to normally-open contact 136 of this relay. The moving contact member 137 acting as change-over contact is connected to phase 128 via magnet coil 125 and 116, respectively.

A series circuit consisting of a light-emitting diode 138 and a series resistor 139 (in parallel with resistor 132) or of a light-emitting diode 140 and a series resistor (in parallel with resistor 133) are in each case connected in parallel with resistors 132 and 133, in which circuits the cathode of light-emitting diode 138 is connected to the anode of diode 130 and the anode of light-emitting diode 140 is connected to the cathode of diode 131. The load circuit is also provided with two protective diodes 142 and 143, of which the anode of diode 142 is connected to the normally-closed contact 143 and the cathode is connected to phase 128 and the cathode of diode 143 is connected to the normally-open contact 136 and the anode is connected to phase 128. In addition, a capacitor 144 is provided which is connected to neutral conductor 129 and to the connection of magnet coil 25 and 116 which is also connected to the contact member 137. In the rest position of contact member 137, shown in FIG. 5, a current flows in each case through magnet coil 25 and 116 during the positive half waves of the system voltage present at phase 128, this current through the magnet coil being indicated by light-emitting diode 138. If the contact member 137 is in its operating position, a current flows through magnet coil 25 and 116 during the negative half waves of the supply voltage at phase 128. This current is then indicated by light-emitting diode 140. If there is no current through magnet coil 25 and 116 in one or in both positions of the contact member 137 (for example in case of a fault in relay 135 or a fault in the magnet coil), the light-emitting diodes 138 and 140 are not illuminated so that they are used not only as indication of the respective operating conditions (position of contact member 137) but also for checking the operation of the appliance.

Contact member 137 is actuated by the magnet coil of relay 135 which is provided in control circuit 124, that is to say in the collector circuit of an output transistor 145 in parallel with a protective diode 146 between the collector of this transistor and circuit ground 127. Transistor 145, the emitter of which is connected to connection 126, is connected with its base via a series resistor 147 to the output 148 of a timer 149 formed by an IC. The timer 149 which is connected to connection 126 and to circuit ground 127 for its supply has an adjustable timing section 150 in the form of an RC network having a variable resistor and a reset input 151 which resets the timer 149 to zero with a voltage zero.

The control circuit 124 exhibits another timer 152 which is formed by an IC and which corresponds to timer 149 with respect to its construction and exhibits an adjustable timing section 153 formed by an RC network, an output 154 and a reset input 155 which resets the timer 152, which is also operated between connection 126 and circuit gorund 127, to zero with the presence of a voltage zero. The outputs 148 and 154 are in each case connected to one input of a NAND gate 156 the output of which is connected via a series circuit of capacitor 157 and resistor 158 to the two reset inputs 151 and 155. The timers 149 and 152 are in each case connected as monostable flipflops, in such a manner that, after the appliance has been switched on, the voltage at outputs 148 and 154 is first zero and a voltage is present at these outputs in each case only after a switching time T1 (switching time of timer 149) and T2 (switching time of timer 152), predetermined by the timing section 150 and 153 concerned, here having been taken by appropriate adjustment of timing sections 150 and 153 that switching time T2 is greater than switching time T1 by an amount t, t being a fraction of T1. In a preferred embodiment, T1 is about 60 seconds, T2 is about 65 seconds and thus t is about 5 seconds.

The operation of the circuit can be explained as follows:

After switch-on of the appliance, outputs 148 and 154 are first zero. As a result, transistor 145 is opened and contact member 137 switches from its rest position shown in FIG. 5 into the operating position so that a current corresponding to the negative half waves at phase 128 flows via diode 131 through magnet coil 25 and 116. After switching time T1, a positive voltage is present at output 148 as a result of which the transistor 145 is cut off and the contact member 137 assumes the rest position shown in FIG. 5 as a result of which a current now flows in the reverse direction via diode 130 through magnet coil 25 and 116 corresponding to the positive half waves of phase 128. After switching time T2 has been reached, a positive voltage is also present at output 154 and thus at the two inputs of gate 156 so that both timers 149 and 152 are reset to zero by the output signal of this gate as a result of which the signals at outputs 148 and 154 become zero again, the contact element 137 of relay 135 is switched back to operating position by the transistor 145 and the "counting process" previously described of timers 149 and 152 begins anew. The circuit previously described thus produces a periodic switch-over of the polarity of the current through magnet coil 25 and 116 in such a manner that the current through this magnet coil flows in one direction in a relatively long period of time (for example 60 seconds) and in the reverse direction in a subsequent relatively short period of time (5 seconds), the actual treatment of the water with the magnetic field occurring during the first relatively long period of time and any particles deposited in the interior of the appliance being repelled and entrained by the treated water in the relatively short second period of time. It is of essence for the result achieved that the second period of time is only a fraction of the first period of time.

We claim:

1. A device for eliminating scale and for preventing the formation of scale in pipe systems through which a liquid flows in which device the liquid is exposed to a magnetic field generated by a magnet coil, comprising:
   (a) a housing having an internal space which is formed in said housing, said internal space being circularly symmetrical to a housing axis,
   (b) a partition positioned in said internal spaced in said housing, said partition subdividing the internal space into two chambers and arranged perpendicularly to the housing axis, said partition being arranged a distance from a housing inside surface that defines said internal space,
   (c) an inlet to one chamber, formed in the housing,
   (d) an outlet from the other chamber, formed in the housing, with the inlet and the outlet being in each case opposite to a central area of the partition,
   (e) said magnet coil concentrically enclosing the partition and being arranged in an annular recess of the housing,
   (f) an annular wall section concentrically enclosing the partition and being provided between the magnet coil and the internal space of the housing and limiting the internal space at its radially outwards located circumferential area, with the partition and the housing at least in its area surrounding the internal space being made of cast iron which is annealed after coasting and before machining the inside surface of the housing (1, 2; 101, 102) and the sides of the partition (14, 108),
   (g) with the housing (1, 2; 101, 102) being provided on its inside surface with a coating of a corrosion-resistant material having a high magnetic conductivity, with the partition (14, 108) being also provided on its sides with a coating of said corrosion-resistant material,
   (h) said annular wall section (26, 118) consisting of a non-magnetic material and having in the direction of the housing axis (S) a width which is larger than the smallest distance between the inside surface of the housing (1, 2; 101, 102) and an opposite surface of the partition (14, 108), and
   (i) a circuit (123, 124) for driving the magnet coil (25, 116) by a DC-current periodically changing its polarity and flowing through the magnet coil (25, 116) in a first direction during a first time interval (T1) and in a second direction opposite to the first during a second time interval (t).

2. The device of claim 1 wherein the annular wall section is formed by a sealing ring (26, 118) of elastic material, said sealing ring arranged between two housing parts (1, 2; 101, 102) forming the housing.

3. The device of claim 2, wherein the housing parts (1, 2; 101, 102) rest against one another with front faces (5, 103) radially outside the magnetic coil (25, 116) and have in the area of the magnet coil and in the area between the latter and an inner ring area of the sealing ring (26, 118) facing the internal space (6, 104) of the housing a distance from one another which is at least greater than the smallest distance formed between the inside surface of the internal space (6, 104) and an opposite surface of the partition (14, 108).

4. The device of claim 1 wherein the hosuing (1, 2; 101, 102) and the partition (14, 108) are ferritic material or iron.

5. The device of claim 1 wherein the inside surface of the housing (1, 2; 101, 102) is constructed in a chamber (6', 6"; 104', 104") in annular steps such that the distance between the inside surface and a center plane (M) of the partition (14), extending perpendicularly with respect to the housing axis (S), is reduced in step-like manner in the direction of the housing axis (S) with increasing radial distance from the housing axis (S).

6. The device of claim 1 wherein the partition (14) is constructed in an annular step-like manner at its side limiting chambers (6', 6") to such a form that the distance from the center plane (M) to the side of the partition is reduced in step-like manner with increasing radial distance from the housing axis (S).

7. The device of claim 6, wherein the inside surface of the housing and the side of the partition (14) in the area constructed in annular step-like manner in each case exhibit first annular areas (7–10; 19–21) which concentrically enclose the housing axis (S) and are perpendicular to the housing axis (S) and second annular areas (11–13; 22–23) which are arranged between the first one and which concentrically and circularly cylindrically enclosure the housing axis (S).

8. The device of claim 7, wherein at least in a radially outside area of the at least one chamber (6', 6") in each case a first annular area (19–21) at the partition (14) is opposite to a first annular area (7–10) of the inside surface of the housing (1, 2).

9. The device of claim 8, wherein at least in the radially outside area of the at least one chamber (6', 6") a second annular area (22, 23) at the partition (14) is adjacent to a second annular area (11–13) at the inside surface of the housing (1, 2) and of these annular areas which are in each case adjacent to one another the second annular area (22, 23) provided at the partition (14) has in each case a smaller radius than the associated adjacent second annular area (11–13) at the inside surface of the housing (1, 2).

10. The device of claim 9, wherein at least in the radially outside area of the at least one chamber (6', 6") at least two annular spaces concentrically enclosing the housing axis (S) are formed between the first and second annular areas (7–10, 19–21; 11–13, 22, 23) which annular spaces have a differing distance from the housing axis (S) and from the center plane (M) and are connected to one another via an upper and lower annular opening and the distance of the first annular area (7), which limits the radially outside space at the inside surface of the housing, from the center plane (M) of the partition (14) is not greater than the distance between the first annular area (20), which limits the radially inside annular space at the partition (14), and this center plane (M).

11. The device of claim 1, wherein at least in one chamber (6', 6") the distance of the partition (14) from the inside surface of the housing (1, 2) in the direction of the housing axis (S) increases with decreasing radial distance from the housing axis (S).

12. The device claim 1, wherein the partition (14) exhibits at its surface facing the inlet opening (17) and the outlet opening (18) a projection which tapers towards its free end.

13. The device of claim 12, wherein the projection (16) is constructed as a point or in the form of a hemisphere.

14. The deice of claim 1, wherein the circuit exhibits a first circuit (123) comprising an electrically controllable change-over member (135, 137) via which the magnet coil (25, 116) is periodically connected to an alternating voltage via oppositely polarized diodes (130, 131), and a second circuit (124) for generating a control signal for driving the current switching member (135, 137).

15. The device of claim 1 wherein the first time interval (T1) is longer than the second time interval (t).

16. The device of claim 15, wherein the partition (108) is provided at its area opposite to the inlet opening (19) and the outlet opening (120) with at least one groove-shaped indentation (111, 112) which concentrically encloses the housing axis (S).

17. The device of claim 16, wherein the partition (108) exhibits an edge or circumferential area of slightly oval construction and enclosing the housing axis (S) so that, in the area of this edge area, a gap formed between the two chambers (104', 104") in the internal space (104) has a changing width along the edge area.

18. The device of claim 1 wherein the recess (117) formed in the housing (101, 102) also extends radially inside the magnet coil (116) with respect to the housing axis (S) between the annular wall section formed by a seal (118) and the magnet coil (116), and wherein its recess (117) has a width of at least 3.5 mm over its entire area in an axial direction parallel to the housing axis (5).

* * * * *